(12) United States Patent
Specht et al.

(10) Patent No.: US 8,201,606 B2
(45) Date of Patent: Jun. 19, 2012

(54) DEVICE FOR TRANSVERSE SEALING

(75) Inventors: Klaus Specht, Darmstadt (DE); Salvatore Capasso, Lund (SE); Kenneth Larsson, Dalby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1081 days.

(21) Appl. No.: 11/920,262

(22) PCT Filed: May 31, 2006

(86) PCT No.: PCT/SE2006/000633
§ 371 (c)(1),
(2), (4) Date: Nov. 13, 2007

(87) PCT Pub. No.: WO2007/008131
PCT Pub. Date: Jan. 18, 2007

(65) Prior Publication Data
US 2009/0049805 A1 Feb. 26, 2009

(30) Foreign Application Priority Data
Jul. 8, 2005 (SE) .................... 0501614-2

(51) Int. Cl.
*B65B 9/06* (2006.01)
(52) U.S. Cl. ................................. 156/515; 53/552
(58) Field of Classification Search .................. None
See application file for complete search history.

(56) References Cited

U.S. PATENT DOCUMENTS

| 4,373,982 A | 2/1983 | Kreager et al. |
| 4,517,790 A * | 5/1985 | Kreager ............ 53/552 |
| 4,534,818 A | 8/1985 | Kreager et al. |
| 5,131,213 A * | 7/1992 | Shanklin et al. ........... 53/477 |
| 5,704,541 A | 1/1998 | Mogard |
| 5,976,315 A | 11/1999 | Martin |

(Continued)

FOREIGN PATENT DOCUMENTS

DE        1486177 A  *  1/1969

(Continued)

OTHER PUBLICATIONS

Japanese Office Action issued by Japanese Patent Office on Jun. 4, 2010 in counterpart Japanese application, and English language translation.

(Continued)

*Primary Examiner* — John L. Goff
*Assistant Examiner* — Barbara J. Musser
(74) *Attorney, Agent, or Firm* — Buchanan Ingersoll & Rooney PC

(57) ABSTRACT

A device (10) and a method for transverse sealing of a tube (12) of thermoplastic coated packaging material are provided. The tube is formed by sealing of an overlapping joint (14) between two mutually opposing edge sections (26, 28) of a sheet of packaging material. The device comprises first and second opposing jaws (16, 18) having first and second main sealing surfaces (20, 22), respectively. The tube is arranged to be flat-laid and squeezed between these main sealing surfaces to heat the thermoplastic there between and obtain a transverse seal along a main sealing line (24) of the tube. The device is characterized in that it is arranged to penetrate the outer edge section (28) of the overlapping joint along the main sealing line prior to sealing to allow the first main sealing surface (20) to contact the inner edge section (26) of the overlapping joint.

15 Claims, 5 Drawing Sheets

U.S. PATENT DOCUMENTS

| | | |
|---|---|---|
| 2002/0117248 A1* | 8/2002 | Basque .................... 156/64 |
| 2002/0189206 A1 | 12/2002 | Capodieci |
| 2004/0142130 A1 | 7/2004 | Capasso et al. |

FOREIGN PATENT DOCUMENTS

| | | |
|---|---|---|
| DE | 100 27 735 C1 | 10/2001 |
| EP | 0 642 914 B1 | 1/1997 |
| EP | 1 066 951 A2 | 1/2001 |
| EP | 1 241 098 B1 | 2/2004 |
| EP | 1 413 520 A1 | 4/2004 |
| EP | 1 127 794 B1 | 11/2004 |
| GB | 2 028 224 A | 3/1980 |
| JP | 2001-97318 A | 4/2001 |
| RU | 2172710 C2 | 4/1997 |
| SU | 1444162 A1 | 2/1987 |
| SU | 1671519 A1 | 4/1989 |

OTHER PUBLICATIONS

Russian Office Action issued by Russian Patent Office on Jun. 4, 2010 in counterpart Russian application, and English language translation.
International Search Report for PCT/SE2006/000633 dated Feb. 2, 2007.

* cited by examiner

DEVICE FOR TRANSVERSE SEALING

TECHNICAL FIELD OF THE INVENTION

The present invention relates to a device and a method for transverse sealing of a tube of thermoplastic coated packaging material, the tube being formed by sealing of an overlapping joint between two mutually opposing edge sections of a sheet of packaging material. The device comprises first and second opposing jaws having first and second main sealing surfaces, respectively, between which the tube is arranged to be flat-laid and squeezed to heat the thermoplastic between the main sealing surfaces and obtain a transverse seal along a main sealing line of the tube.

BACKGROUND ART

Within packaging technology, use has long been made of packages for packing and transporting products such as milk, juice and other pourable products. A large group of these packages is produced from a laminated packaging material comprising a core layer of, for example, paper or paperboard and an outer, liquid-tight coating of thermoplastic material on at least that side of the core layer which forms the inside of the package. Sometimes the material also includes a gas barrier, for example in the form of an aluminium layer.

Such packaging containers are often produced in that a web of packaging material is formed into a tube by sealing the longitudinal overlapping edges of the web. The longitudinally sealed tube is continuously filled with a product and then transversally sealed and formed into cushions. The sealing is made along narrow, transverse, mutually spaced apart, sealing zones. The transverse sealing of the tube takes place in a per se known manner substantially at right angles to the longitudinal direction of the tube and constantly in the same plane. The sealed-off portions of the tube thus containing contents are thereafter separated from the tube by means of incisions in these sealing zones.

In a known machine for producing packages like the ones described above, the transverse sealing of the tube is effected by arranging the tube between two opposing jaws. The jaws each comprises a sealing bar, the tube being flat-laid and squeezed between these sealing bars to heat the thermoplastic material in the sealing zone and obtain the seal. The area where the longitudinal seal intersects the transverse sealing zone will contain three layers of packaging material instead of the common number of two. Therefore, this area will be a critical one when it comes to sealing, especially in connection with certain sealing techniques, such as ultrasonic sealing. Accordingly, to achieve essentially constant pressure along the whole transverse sealing zone, and thereby a good transverse seal, the jaw contacting the intersection between the longitudinal seal and the transverse sealing zone may be constructed so as to have a slot with a width slightly larger than the width of the longitudinal seal.

When the longitudinal seal is aligned optimally, the slot provides for substantially uniform pressure along the transverse sealing zone by receiving the third outer packaging material layer of the longitudinal seal. On the contrary, if the longitudinal seal is somewhat offset from its optimal alignment, e.g. by tube twisting, the longitudinal seal may be positioned partly along a portion of the jaw outside the slot during transverse sealing and thereby be subjected to a too high pressure. Similarly, the transverse sealing zone outside the longitudinal seal intersection may be positioned partly along a portion of the jaw within the slot during transverse sealing and thereby be subjected to an insufficient pressure. A too high pressure as well as an insufficient pressure may affect the transverse sealing negatively, a correct alignment of the longitudinal seal in relation to the jaws therefore being of great importance. However, to achieve this correct alignment, accurate adjustments need to be done by an operator, which can be both time consuming and cumbersome.

Further, as mentioned above, to be able to obtain the substantially uniform pressure, the slot must be slightly wider than the longitudinal seal. As apparent from the discussion above, the desired pressure is not obtained with a slot being too wide, nor too narrow. Therefore, the use of a jaw provided with a slot of a fixed width is limited to transverse sealing of tubes with a certain longitudinal seal width. Consequently, in an environment where different kinds of tubes with different longitudinal seal widths are to be transversally sealed, jaws with different slot widths need to be provided.

SUMMARY OF THE INVENTION

An object of the present invention is to provide a device and a method for transverse sealing, which device and method, at least partly, eliminate potential limitations of prior art. The basic concept of the invention is to penetrate the outermost one of the three layers in the intersection between the longitudinal seal and the transverse sealing zone of the tube prior to transverse sealing of the same to obtain the same material thickness, and therefore essentially the same sealing quality, in this intersection area as in the rest of the transverse sealing area.

The device and method for achieving the object above are defined in the appended claims and discussed below.

A device for transverse sealing of a tube of thermoplastic coated packaging material, the tube being formed by sealing of an overlapping joint between two mutually opposing edge sections of a sheet of packaging material, according to the present invention comprises first and second opposing jaws having first and second main sealing surfaces, respectively. The tube is arranged to be flat-laid and squeezed between these first and second main sealing surfaces to heat the thermoplastic there between and obtain a transverse seal along a main sealing line of the tube. The device is characterized in that it is arranged to penetrate the outer edge section of the overlapping joint along the main sealing line prior to sealing to allow the first main sealing surface to contact the inner edge section of the overlapping joint.

By transverse sealing is meant sealing across another existing seal, i.e. sealing in an area of intersection between two seals.

In manufacturing packages of the above described kind, the overlapping joint corresponds to the longitudinal seal, and the main sealing line corresponds to the transverse sealing zone.

The sheet can be comprised in a web, to form a portion of the same, and the device can be arranged for transverse sealing of this web. Such an alternative would be particularly useful in connection with a manufacturing method like the one initially described.

By main sealing line is meant that transverse line along the flat-laid package along which a continuous seal is to be obtained.

By inner edge section is meant the edge section arranged to be on the inside of the tube. Similarly, by outer edge section is meant the edge section arranged to be on the outside of the tube.

By penetrating the outer edge section of the overlapping joint prior to sealing, the first main sealing surface can transfer energy directly to the inner edge section of the overlapping joint to obtain a seal between this inner edge section and the opposing wall of the flat-laid tube. Thus, the energy need not first be transferred through the outer edge section and can therefore be used more effectively.

An advantage with the device according to the present invention is that the positioning of the overlapping joint in relation to the jaws during sealing becomes less critical since the overlapping joint need not be precisely arranged in a slot or similar. Another advantage is that one and the same inventive device can be used in connection with transverse sealing of different kinds of tubes with varying overlapping joint widths.

According to one embodiment, the jaws are arranged to interact so as to achieve an essentially uniform pressure along the main sealing line when the main sealing surfaces are parallelly arranged. This is possible since the penetration of the outer edge section results in that the thickness of the material squeezed between the jaws during sealing is essentially constant along the length of the main sealing line. This embodiment resembles a situation with transverse sealing of a tube of packaging material with no overlapping joint (longitudinal seal) where the problems initially described are not present.

The device can be constructed so as to be arranged to penetrate the outer edge section of the overlapping joint by cutting it so as to form a flap of packaging material displaceable to expose the inner edge section of the overlapping joint to the first main sealing surface. By creating such a flap, packaging material of the outer edge section which is "in the way" of the first main sealing surface can be moved "out of the way" to effect the transverse sealing without being permanently removed from the tube. This is advantageous since no unnecessary waste thereby will be produced that requires particular handling. Instead, the flap will be a part of the final package with no affect on its performance.

In an embodiment as the one described above, the device may further comprise a receiving space for receiving the flap to uncover the inner edge section along the main sealing line during sealing. The receiving space can be formed in a number of different ways, for example as a notch along the first main sealing surface. In such a case, the notch should preferably have a length and a width slightly larger than the length and the width of the flap. Further, the receiving space could be arranged to be positioned opposite the overlapping joint prior to the penetration of the outer edge section of the overlapping joint. This is advantageous since it may allow automatic reception of the flap in the receiving space in connection with the penetration of the outer edge section.

According to one embodiment, the first jaw of the inventive device comprises a penetration means for the penetration of the outer edge section of the overlapping joint prior to sealing. The penetration means can be formed in a number of different ways, for example as a tapered part of the first main sealing surface. This configuration is advantageous since it allows a relatively uncomplicated and stable construction of the device. Further, the penetration means could be arranged to be positioned opposite the overlapping joint prior to the penetration of the outer edge section of the overlapping joint. This is advantageous since it may allow automatic penetration of the outer edge section when the jaws approach each other to squeeze the packaging material.

In accordance with one embodiment, the first jaw further comprises a recess on one side of the main sealing surface, the recess being arranged to receive a part of the overlapping joint on a corresponding side of the main sealing line during the penetration and sealing. By this recess, which corresponds to the slot described in the background art paragraph above, the pressure exerted on the overlapping joint can be reduced so as to achieve a well defined transverse seal.

The device according to the present invention is applicable in connection with different types of techniques for transverse sealing, such as, for example, ultrasonic sealing and heat sealing. When used in connection with ultrasonic sealing, the first jaw is an anvil and the second jaw is an ultrasonic horn.

A method for transverse sealing of a tube of thermoplastic coated packaging material, the tube being formed by sealing of an overlapping joint between two mutually opposing edge sections of a sheet of packaging material, according to the present invention comprises squeezing the tube in a flat-laid condition between first and second main sealing surfaces of first and second opposing jaws, respectively, to heat the thermoplastic between the main sealing surfaces and obtain a transverse seal along a main sealing line of the tube. The method is characterized by further comprising penetrating the outer edge section of the overlapping joint along the main sealing line prior to sealing to allow the main sealing surface of the first jaw to contact the inner edge section of the overlapping joint.

The characteristics discussed in connection with the device for transverse sealing are, of course, transferable to the method of transverse sealing. Further, these characteristics may naturally be combined in the same embodiment.

BRIEF DESCRIPTION OF THE DRAWINGS

The invention will be described in more detail with reference to the appended schematic drawings, which show an example of a presently non-limiting preferred embodiment of the present invention.

FIG. 4b is an enlargement of the encircled area in FIG. 4a.

DETAILED DESCRIPTION OF PREFERRED EMBODIMENTS

Figure 1:
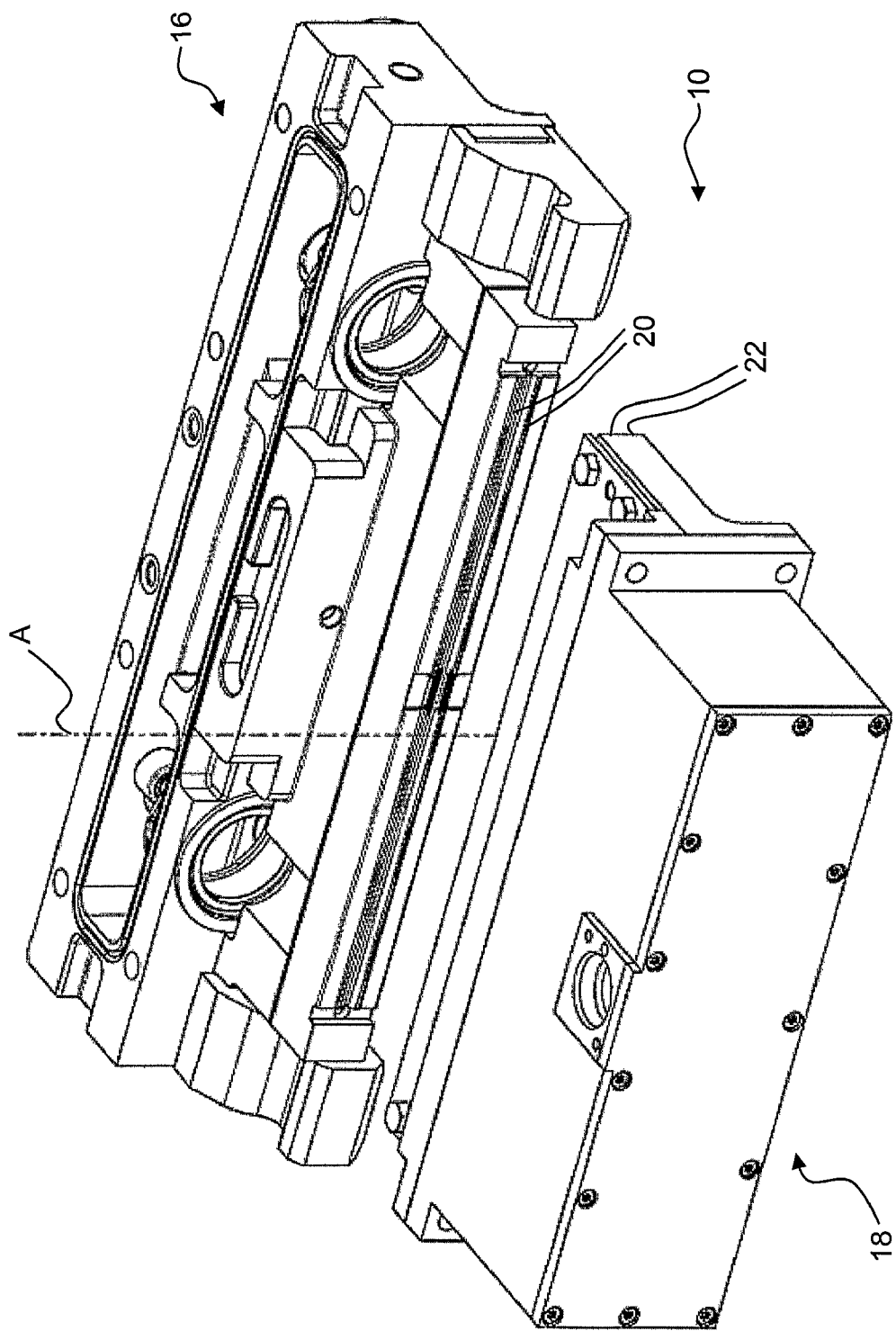
FIG. 1 is a perspective view of a device for transverse sealing according to the present invention.
Figure 2:
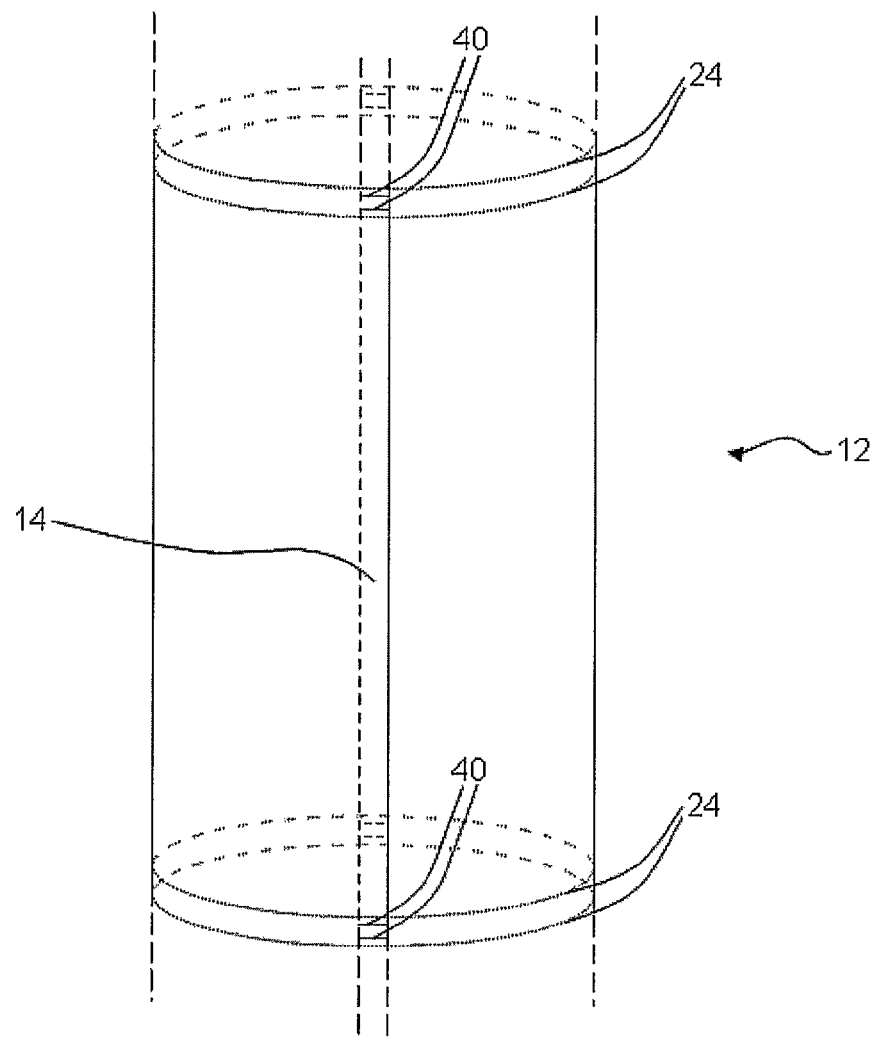
FIG. 2 is a perspective view of a portion of a tube of packaging material which is to be flat-laid and transversally sealed by means of the device according to FIG. 1.

FIG. 1 illustrates a device 10 for transverse sealing of a tube 12 of packaging material, a portion of which is illustrated in FIG. 2. The tube 12 is formed by longitudinal sealing of an overlapping joint 14 between two mutually opposing edge sections of a packaging material web. The packaging material is of the initially described type, i.e. a laminated packaging material comprising a core layer of paper coated, on both sides, with a thermoplastic material. Thereby, the sealing of the overlapping joint can be achieved by heating the thermoplastic material in the interface between the overlapping edge sections in accordance with any suitable sealing technique.

The device 10 is an ultrasonic sealing device working in accordance with well known principles to effect the transverse sealing of the tube 12. It comprises two opposing jaws serving as an anvil 16 and an ultrasonic horn 18. As will be described in more detail below, the tube 12 is arranged between the anvil and the horn and locally flat-laid and squeezed between main sealing surfaces 20, 22 thereof at regular intervals to obtain transverse seals along main sealing lines 24. The location of the main sealing lines is not fixed but defined by the location of the main sealing surfaces in relation to the tube. Thus, the main sealing lines are not printed on the tube as it may seem from FIG. 2 but just imaginary and drawn there for illustrative purposes.

Figure 3:
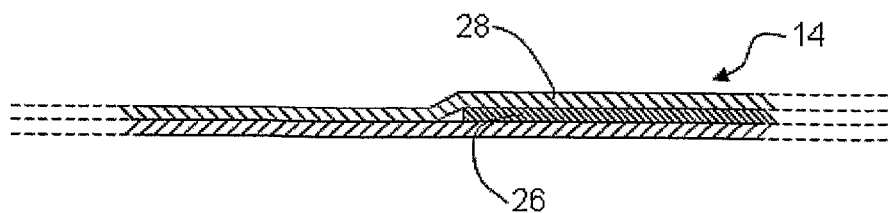
FIG. 3 is a partial cross section of the tube shown in FIG. 2 in a flat-laid condition.
Figure 4A:
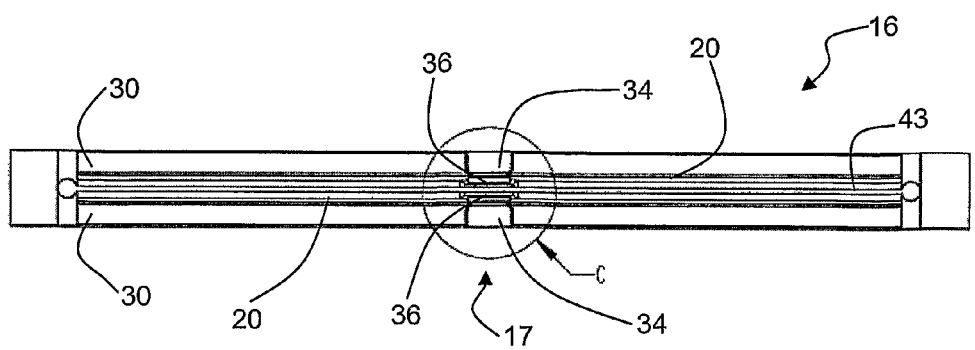
FIG. 4a is a front view partially showing the anvil of the device according to FIG. 1 in more detail.
Figure 4B:
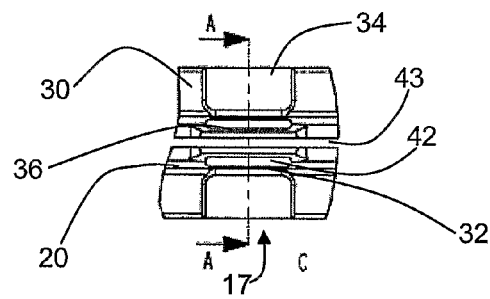
Figure 4C:
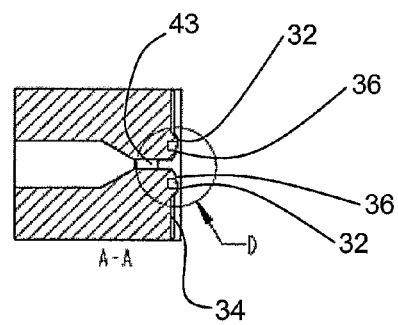
FIG. 4c is a cross section of the anvil taken along line A-A in FIG. 4b.
Figure 4D:
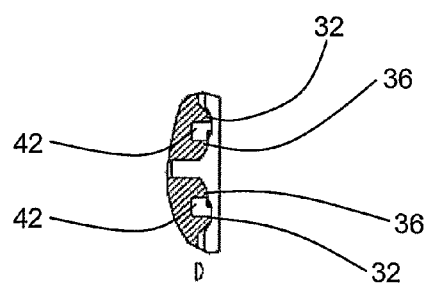
FIG. 4d is an enlargement of the encircled area in FIG. 4c.

FIG. 3 illustrates, in part, the appearance of the tube cross section along a main sealing line where the tube is flat-laid and squeezed. As apparent from the figure, the material thickness along the cross section is the double wall thickness everywhere except in the area of the joint 14 where the material thickness instead is the triple wall thickness because of overlapping inner and outer edge sections 26, 28, respectively. As initially described, this triple wall thickness area, or more particularly the transitions between the double and triple wall thickness areas, will be critical when it comes to transverse sealing. For this reason, the device is constructed as described below.

FIG. 4a-d are views illustrating the anvil 16 in more detail. Since the device is constructed so as to produce two transverse seals simultaneously, an upper transverse seal of one package and a lower transverse seal of another package, as is well known in the art, the anvil is constructed in accordance therewith. Naturally, so is the ultrasonic horn which, however, is not described in detail herein. Thus, the anvil 16 comprises base surfaces 30, the main sealing surfaces 20 being raised above the respective base surfaces. The main sealing surfaces 20 extend continuously across essentially the whole length of the anvil with a constant width except in an intermediate part 17 of the anvil where the main sealing surfaces are tapered and have a reduced width. Besides for, as the rest of the main sealing surfaces 20, taking part in the transverse sealing of the tube by interaction with the corresponding main sealing surfaces 22 of the ultrasonic horn 18, the tapered parts are arranged to function as penetration means 32 for cutting the outer edge section 28 in connection with transverse sealing, as will be further discussed below.

Further, the anvil 16 comprises a recess 34 in the intermediate part 17 of each of the base surfaces 30 for receiving the overlapping longitudinal seal in connection with transverse sealing. Additionally, the anvil 16 comprises sub sealing surfaces 36, also arranged in the intermediate part 17 of the anvil. The main sealing surfaces 20 are raised above the sub sealing surfaces 36, the sub sealing surfaces, in turn, being raised above the base surfaces 30. When the tube 12 is flat-laid and squeezed between the main sealing surfaces 20, 22 for obtaining transverse seals along main sealing lines 24, the sub sealing surfaces 36 of the anvil are arranged to interact with corresponding sub sealing surfaces 38 (shown in FIG. 5) of the ultrasonic horn 18 to obtain seals along sub sealing lines 40. Imaginary such sub sealing lines are shown in FIG. 2. The anvil 16 further has receiving spaces 42 in the form of notches in the intermediate part 17 of the anvil, between the corresponding pair of penetration means 32 and sub sealing surface 36. The function of these receiving spaces will be described below. Finally, the anvil 16 comprises a groove 43 extending along and between the main sealing surfaces 20. A knife 44 (shown in FIG. 5) is arranged to run in this groove and a corresponding groove 46 in the ultrasonic horn to separate the sealed-off parts of the tube, as initially mentioned.

Figure 5:
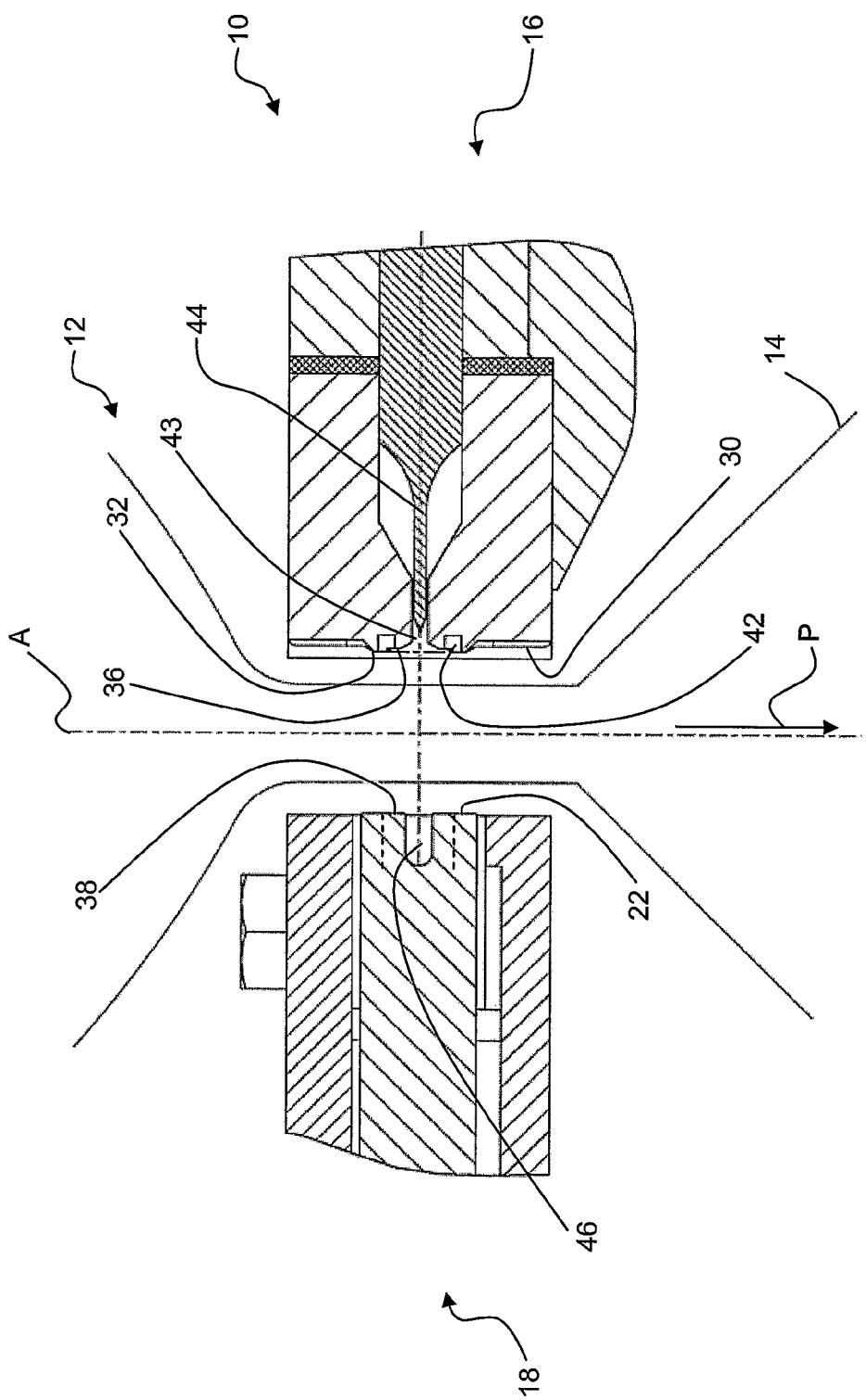
FIG. 5 is a cross section illustrating the operation of the device according to FIG. 1.
Figure 6:
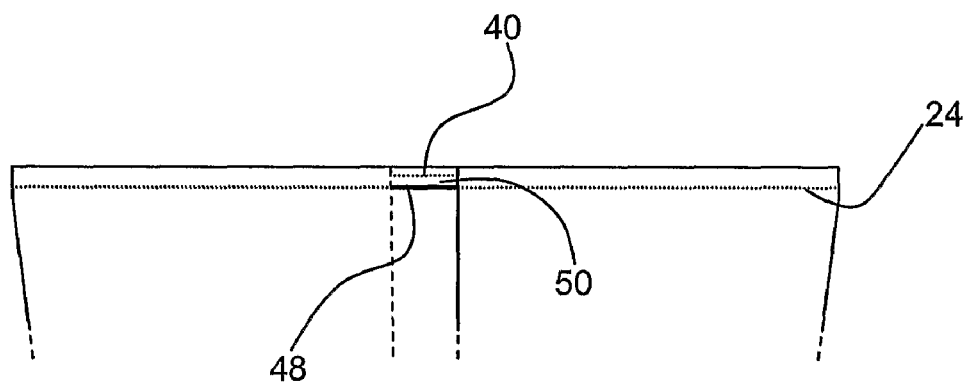
FIG. 6 is a front view of a part of the tube portion in FIG. 2 after transverse sealing and separation.

FIG. 5 is a cross section taken in the area of the intermediate part 17 of the anvil 16, illustrating the operation of the device 10. FIG. 6 is a front view of a sealed-off and separated part of the tube 12. The following description is directed to the transverse sealing of this part of the tube which is obtained with one "half" of the inventive device. In connection with manufacturing of packages, the continuously longitudinally sealed tube, which is filled with the intended product, is fed in a direction denoted P along an axis A. The anvil 16 and the ultrasonic horn 18 are arranged opposite each other with the tube 12 in between them. At regular intervals the tube 12 is to be transversally sealed by ultrasonic sealing. The anvil 16 and the ultrasonic horn 18 then approach each other so as to contact the tube along the main sealing surfaces 20, 22 and sub sealing surfaces 36, 38. When the anvil and the horn move closer to each other, the tube 12 is flat-laid and squeezed. The longitudinal overlapping joint 14 is arranged directly opposite the intermediate part 17 of the anvil and received in the recess 34. With continuous squeezing, the penetration means 32 cuts through the outer edge section 28 of the joint 14 along a cutting line 48 and contacts the inner edge section 26 of the joint, whereas the sub sealing surface 36 contacts the outer edge section 28 of the joint. In this moment, the main sealing surfaces 20 and 22 are parallelly arranged and they interact to create an essentially uniform pressure along the main sealing line 24. This is possible since the material thickness along the whole main sealing line is constant and equal to the double wall thickness. The material thickness along the sub sealing line 40 is the triple wall thickness but this is compensated by the distance between the sub sealing surfaces 36, 38 being larger than the distance between the main sealing surfaces 20, 22.

Although not apparent from the figures, the penetration means 32 is wider than the overlapping joint 14. However, the cutting will stop after penetration of the outer edge section, i.e. when constant material thickness has been obtained between the main sealing surfaces, leaving the rest of the packaging material undamaged. Because of the penetration means being wider, the positioning of the overlapping joint in relation to the device is less critical. Also, one and the same device with such a relatively wide penetration means can be used for transverse sealing of tubes with different overlapping joint widths.

Thus, in connection with the cutting of the outer edge section 28, a flap 50 of packaging material is created. The flap 50 is forced into the corresponding receiving space 42 and out of the way of the main sealing surface 20 which then can produce a continuous transverse seal along the main sealing line by interaction with the main sealing line 22. Simultaneously, the sub sealing surface 36 produces a continuous seal along the sub sealing line by interaction with the sub sealing surface 38. Accordingly, two essentially parallel seals are formed in the area of the overlapping joint, one through a double layer of packaging material and one through a triple layer of packaging material. In reality, these two seals are not distinctively formed but melted together.

Above, transverse sealing of a continuous tube formed from a web of packaging material has been described. However, the tube need not be "infinitely" long but can be of any length. Especially, the tube may be the sleeve of one single package, i.e. a so called package blank.

The above-described embodiments should only be seen as examples. A person skilled in the art realizes that the embodiments discussed can be combined and varied in a number of ways without deviating from the inventive conception.

For example, in the above described embodiment, the device is constructed so that the anvil shows the inventive features. Naturally, the device could also be constructed in the opposite way so that the ultrasonic horn instead has these features. The tube should then be arranged with its overlapping joint facing the ultrasonic horn.

As another example, the invention is not limited to use in connection with ultrasonic sealing. It can also be used with other sealing techniques, such as heat sealing.

Additionally, the appearance of the transverse seal obtained by the embodiment above is just exemplary. The transverse seal need not be positioned perpendicular to the longitudinal seal. Also, the transverse seal need not extend continuously across the extension of the flat-laid tube.

Also, the penetration of the outer edge section need not be affected by means of penetration means comprised within the anvil. For example, the penetration means could instead be arranged so as to be separate from the anvil and the horn.

Finally, it should be pointed out that the figures are not drawn according to scale.

The invention claimed is:

1. A device for transverse sealing of a tube of thermoplastic coated packaging material, the tube being formed by sealing of an overlapping joint between mutually opposing inner and outer edge sections of a sheet of packaging material, the device comprising first and second opposing jaws having first and second main sealing surfaces, respectively, between which the tube is arranged to be flat-laid and squeezed to heat the thermoplastic between the first and second main sealing surfaces and obtain a transverse seal along a main sealing line of the tube, and penetration means for penetrating only the outer edge section of the overlapping joint along the main sealing line prior to sealing to allow the first main sealing surface to contact the inner edge section of the overlapping joint, wherein the first jaw comprises the penetration means for penetrating only the outer edge section of the overlapping joint prior to sealing and wherein the penetration means is formed as a tapered part of the first main sealing surface, the tapered part of the first main sealing surface being adjacent to a non-tapered part of the first main sealing surface.

2. A device according to claim 1, wherein the jaws are arranged to interact so as to achieve an essentially uniform pressure along the main sealing line when the main sealing surfaces are parallelly arranged.

3. A device according to claim 1, wherein the penetration means cuts the outer edge section so that packaging material is displaceable to expose the inner edge section of the overlapping joint to the first main sealing surface.

4. A device according to claim 3, further comprising a receiving space for receiving the displaceable packaging material to expose the inner edge section along the main sealing line during sealing.

5. A device according to claim 4, wherein the receiving space is formed as a notch along the first main sealing surface.

6. A device according to claim 4, wherein the receiving space is arranged to be positioned opposite the overlapping joint prior to the penetration of the outer edge section of the overlapping joint.

7. A device according to claim 1, wherein the penetration means is arranged to be positioned opposite the overlapping joint prior to the penetration of the outer edge section of the overlapping joint.

8. A device according to claim 1, wherein the first jaw further comprises a recess on one side of the main sealing surface, the recess being arranged to receive a part of the overlapping joint on a corresponding side of the main sealing line during the penetration and sealing.

9. A device according to claim 1 for use in ultrasonic sealing, the first jaw being an anvil and the second jaw being an ultrasonic horn.

10. A device for transverse sealing a tube of thermoplastic coated packaging material in which mutually opposing inner and outer edge sections of the packaging material are longitudinally sealed together at an overlapping joint, the device comprising:
first and second opposing jaws having two first main sealing surfaces and two second main sealing surfaces, respectively, between which the tube is arranged to be flat-laid and squeezed to heat the thermoplastic and obtain a pair of transverse seals along a main sealing line of the tube;
the first jaw having two longitudinally extending base surfaces each of which adjoins a respective one of the two first main sealing surfaces;
a knife-receiving groove in the first jaw between the two first main sealing surfaces for receiving a movable knife which is operable to separate sealed-off parts of the tube, each of the first main sealing surfaces being positioned between the knife-receiving groove and the respective adjoining base surface;
each of the two first main sealing surfaces extending longitudinally along the first jaw from an intermediate portion of the first jaw towards opposite ends of the first jaw;
a tapered penetration part positioned to penetrate only the outer edge section of the overlapping joint along the main sealing line prior to sealing to allow the first main sealing surfaces to contact the inner edge section of the overlapping joint; and
the first jaw also comprising two sub sealing surfaces positioned on opposite sides of the knife-receiving groove.

11. A device according to claim 10, wherein an intermediate portion of each base portion includes a recess which receives the overlapping joint during the transverse sealing.

12. A device according to claim 10, wherein the tapered penetration part is an intermediate portion of reduced width of the two first main sealing surfaces, further comprising a notch located between each sub sealing surface and the adjacent intermediate portion of reduced width of the first main sealing surface, each notch forming a receiving space that receives packaging material displaced by the tapered penetration part.

13. A device for transverse sealing a tube of thermoplastic coated packaging material in which mutually opposing inner and outer edge sections of the packaging material are longitudinally sealed together at an overlapping joint, the device comprising first and second opposing jaws having first and second main sealing surfaces, respectively, between which the tube is arranged to be flat-laid and squeezed to heat the thermoplastic between the first and second main sealing surfaces and obtain a transverse seal along a main sealing line of the tube, one of the first and second jaws comprising a movable knife operable to separate sealed-off parts of the tube, the other of the first and second jaws comprising a groove which receives the knife as the knife is operated to separate the sealed-off parts of the tube, an intermediate portion of the first main sealing surface being tapered relative to other portions of the first main sealing surface on opposite longitudinal ends of the intermediate portion to penetrate the outer edge section of the overlapping joint prior to sealing to allow the first main sealing surface to contact the inner edge section of the overlapping joint.

14. A device according to claim 13, wherein the intermediate portion of the first main sealing surface which is tapered is located at an intermediate portion of the first jaw, the intermediate portion of the first jaw also including a recess which receives the overlapping joint during the transverse sealing.

15. A device according to claim 14, wherein the intermediate portion of the first main sealing surface which is tapered penetrates the outer edge section of the overlapping joint to produce a flap of packaging material, further comprising a notch located in the intermediate portion of the first main sealing surface, the notch forming a receiving space that receives the flap of packaging material.

* * * * *